United States Patent Office

3,177,119
Patented Apr. 6, 1965

3,177,119
AEROSOL HAIR LACQUERS CONTAINING LOW VISCOSITY POLYVINYL ACETALS
Hans Zoebelein, Dusseldorf-Eller, Germany, assignor to Henkel & Cie. G.m.b.H., Dusseldorf-Holthausen, Germany, a corporation of Germany
No Drawing. Filed June 26, 1962, Ser. No. 205,206
Claims priority, application Germany, July 3, 1961, H 43,037
10 Claims. (Cl. 167—87.1)

The invention relates to a novel process of holding human hair which comprises applying to the hair a solution of low viscosity polyvinyl acetals in a lower alkanol. The invention also relates to sprayable hair lacquer compositions comprising a solution of low viscosity polyvinyl acetals in a lower alkanol and a propellent.

The substances used as film formers in aersol hair lacquers have to fulfill a number of different requirements and particularly:

(1) They must be readily soluble in the solvents employed, particularly in lower aliphatic alcohols such as ethanol and isopropanol.

(2) The solutions must be miscible with the propellents such as difluoro dichloromethane without becoming cloudy or foaming precipitates.

(3) The viscosity of the film formers must not be too high so that a good aerosol formation is assured upon spraying of the composition.

(4) The film formed therewith should adhere well to the hair. It must not come off in the form of dust or scales upon mechanical treatment such as upon combing.

(5) The film should be clearly transparent and lustrous.

(6) The film should be flexible, but at the same time should possess a sufficient strength and elasticity in order to fix the coiffure.

(7) The film should not be tacky and should not become tacky even at high relative humidity.

(8) The film should be easily removed by means of normal hair shampoo.

(9) The film should have a good anti-static effect.

Substances which meet all these requirements particularly requirements 7 and 8, are difficult to find since in general the substances which are easily removed become tacky at high relative humidity due to their good water solubility. For example, polyvinyl pyrrolidone which has been widely used as the film former in aerosol hair lacquers dissolves readily in water but becomes tacky in atmospheres of high humidity.

It is an object of the invention to provide a novel process of holding human hair.

It is another object of the invention to provide novel sprayable hair lacquer compositions which meet all the necessary requirements of hair lacquers.

These and other objects an dadvantages of the invention will become obvious from the following detailed description.

The novel sprayable hair lacquer compositions of the invention comprise a solution of low viscosity polyvinyl acetals of aldehydes having 2 to 8 carbon atoms and having 10% to 30% non-acetalized vinyl alcohol units in a lower aliphatic alcohol having 1 to 7 carbon atoms and a propellent, the said polyvinyl acetals being 0.5 to 10%, preferably 0.5 to 5%, by weight of the entire composition. The high amount of free hydroxy groups in the low viscosity polyvinyl acetals limit the water absorption capacity of the said acetals but the said acetals are still soluble or dispersible in dilute aqueous solutions of washing agents and wetting agents.

The polyvinyl acetals are polyvinyl acetals of alkyl aldehydes having 2 to 8 carbon atoms. Examples of suitable aldehydes are acetaldehyde, propionaldehyde, butyraldehyde, isobutyraldehyde, capronaldehyde, caprylaldehyde, etc. Also, mixtures of the various aldehydes may be used. The preferred polyvinyl acetals are derived from butyraldehyde and isobutyraldehyde. The commercially available polyvinyl acetals usually contain 1 to 5% acylate groups such as acetate groups and may be used in the novel compositions.

The percentage of free hydroxy groups in the polyvinyl acetal to obtain the desired properties will vary according to the aldehyde used for the acetalization, the percentage of acylate radicals and the molecular weight of the polyvinyl acetate. Other minor variations may result according to the process of manufacture. If the polyvinyl acetal is derived from a single aldehyde, the percentage of free hydroxy groups needed to obtain optimum properties increases with an increase of the molecular weight of the polyvinyl acetal. For a given molecular weight of polyvinyl acetal, the percentage of free hydroxy groups required decreases with the decrease in the number of carbon atoms in the aldehyde used for acetalization. The viscosity of polyvinyl acetal which increases with its molecular weight should be low and the polyvinyl acetals whose 5% solution in butanol have a viscosity of less than 70 cp., preferably less than 20 cp., are most suitable.

At a given molecular weight and acylate content the most favorable ratio of acetal groups to hydroxy groups may be readily determined by means of a series test. For instance, if a commercial polyvinyl butyral with an acetate content of 2% and whose 5% solution in butanol has a viscosity of 15 to 20 cp. is used, particularly favorable results are obtained if the polyvinyl acetal contains 24% free vinyl alcohol units and 74% acetalized vinyl alcohol units. For polyvinyl acetaldehyde acetals sufficient dispersibility in aqueous wetting agent solutions is obtained with a content of 15 to 20% free vinyl alcohol units.

It is often advantageous to incorporate into the polyvinyl acetals small amounts up to 8% of aliphatic aldehydes having 8 to 20 carbon atoms to effect an internal plastification of the film and to improve the emulsifying properties of the film. To improve the dispersibility of polyvinyl acetals whose dispersibility is not completely satisfactory, small amounts of surface active compounds up to 10% may be added to the polyvinyl acetal. For example, the addition of 5% of a commercial alkyl benzene sulfonate based on the weight of the polyvinyl acetal improves the dispersibility of polyvinyl acetals which are not otherwise satisfactorily dispersed.

The solvents for the compositions of the invention are lower alkanols having 1 to 4 carbon atoms and comprise 10 to 50% by weight of the composition. Examples of suitable solvents are methanol, ethanol, propanol, isopropanol, butanol, etc. The preferred solvents are ethanol and isopropanol. It is advantageous to use instead of the alcohols their mixtures with volatile chlorinated hydrocarbons, especially with methylene chloride in a quantity of about 30 to 70% of the used alcohol. Compositions according to the invention containing such mixtures of solvents dry very quickly.

The propellants may be the usual propellants used in aerosol sprays such as halogenated hydrocarbons, and comprise 50% to 89% by weight of the compositions. Examples of suitable commercially available propellants are trichloro-monofluoro-methane, dichloro-difluoro-methane, dichloro-trifluoro-ethane, etc., and mixtures of the propellants. The selection of the propellant depends upon the desired pressure to be used in the aerosol spray can.

The novel hair lacquer compositions of the invention may also contain the usual additives such as plasticizers, perfumes, dyes, brighteners, evaporation retarders, lanolin derivatives, etc.

The process for holding human hair according to the invention comprises applying to the human hair a solution of low viscosity polyvinyl acetals of aldehydes having 2 to 8 carbon atoms and having 10% to 30% non-acetalized vinyl alcohol units in a lower aliphatic alcohol having 1 to 4 carbon atoms. The said solution is applied to the hair after the coiffure has been arranged and holds the hair in place.

In the following examples there are described several preferred embodiments to illustrate the invention. However, it should be understood that the invention is not intended to be limited to the specific embodiments.

Example I

For the preparation of an aerosol hair lacquer, 4.0 parts of the polyvinyl butyral disclosed below were dissolved in 40.0 parts of isopropanol. To this solution 0.5 part of alcohol-soluble lanolin and 0.3 part of perfume were added. Thereafter, the solution was filled in the usual manner together with 75.0 parts of dichloro-difluoro-methane as propellant into an aerosol spray can.

The polyvinyl butyral used in this example was a product which is commercially available under the name PIOLO-FORM B1 24. This product had the following characteristic values:

| | |
|---|---|
| Vinyl alcohol units acetalized _____percent__ | 74 |
| Vinyl alcohol units acetylated _____do____ | 2 |
| Vinyl alcohol units free _____do____ | 24 |
| Viscosity of a 10% solution in ethyl acetate-methanol 1:3 _____cp__ | 11 |
| Viscosity of a 5% solution in butanol _____cp__ | 16.3 |

Upon aerosol spraying, the hair lacquer obtained in this manner furnished a clearly transparent, lustrus film which firmly adhered to the hair. Even at high relative humidity the film remained unchanged, but it could readily be removed with the aid of a normal hair shampoo. Upon mechanical treatment by combing, the film remained practically undamaged. Furthermore, upon combing the hair did not become electrostatically charged.

Example II

For the preparation of an aerosol hair lacquer, 2.0 parts of the acetaldehyde acetal of polyvinyl alcohol disclosed below were dissolved in 20.0 parts of isopropanol. To this solution 20.0 parts of methylene chloride and 0.2 part of perfume were added. Thereafter, the solution was filled in the usual manner together with 53.8 parts of dichloro-difluoro-methane as propellant into an aerosol spray can.

The used acetaldehyde acetal of polyvinyl alcohol had the following characteristic values:

| | |
|---|---|
| Vinyl alcohol units acetalized _____percent__ | 82.7 |
| Vinyl alcohol units acetylated _____do____ | 3.2 |
| Vinyl alcohol units free _____do____ | 14.1 |
| Viscosity of a 10% solution in ethyl acetate-methanol 1:3 _____cp__ | 50 |

Upon aerosol spraying, the hair lacquer obtained in this manner furnished a clearly transparent, lustrous film which firmly adhered to the hair and which had similar good qualities as the film produced after Example I, but it could be removed with the aid of a normal hair shampoo more readily than the film produced according to Example I.

Example III

For the preparation of an aerosol hair lacquer, 3.0 parts of the polyvinyl butyral disclosed below were dissolved in 20.0 parts of ethanol. To this solution, 20.0 parts of methylene chloride and 0.1 part of perfume were added. Thereafter, the solution was filled in the usual manner together with 56.9 parts of dichloro-difluoro-methane as propellant into an aerosol spray can.

The used polyvinyl butyral had the following characteristic values:

| | |
|---|---|
| Vinyl alcohol units acetalized _____percent__ | 71.2 |
| Vinyl alcohol units acetylated _____do____ | 2.2 |
| Vinyl alcohol units free _____do____ | 26.6 |
| Viscosity of a 10% solution in ethyl acetate-methanol 1:3 _____cp__ | 18 |

A hair lacquer was obtained which upon aerosol spraying had similar qualities as the product obtained according to Example I.

This example was repeated, wherein polyvinyl butyral used had the following characteristic values:

| | |
|---|---|
| Vinyl alcohol units acetalized _____percent__ | 75.4 |
| Vinyl alcohol units acetylated _____do____ | 2.6 |
| Vinyl alcohol units free _____do____ | 22.0 |
| Viscosity of a 10% solution in ethyl acetate-methanol 1:3 _____cp__ | 21 |

The product had again similar good qualities as the hair lacquer produced according to Example I.

Various modifications of the process and/or compositions may be made without departing from the spirit or scope thereof, and it is to be understood that the invention is to be limited only as defined in the appended claims.

I claim:

1. A sprayable hair lacquer composition comprising a solution of low viscosity polyvinyl acetal of an alkyl aldehyde having 2 to 8 carbon atoms and having 10 to 30% non-acetalized vinyl alcohol units and whose 5% solution in butanol has a viscosity of less than 70 cp. in a solvent selected from the group consisting of lower alkanols having 1 to 4 carbon atoms and mixtures of such alcohols with methylene chloride and a hydrocarbon propellant, the said polyvinyl acetal being 0.5 to 10% by weight of the entire composition.

2. The composition of claim 1 wherein the polyvinyl acetal is 0.5 to 5% by weight of the entire composition.

3. The composition of claim 1 wherein the polyvinyl acetal contains a surface active compound to improve water dispersibility.

4. The composition of claim 1 wherein the polyvinyl acetal is a polyvinyl acetal of butyraldehyde.

5. The composition of claim 1 wherein the propellant is a halogenated hydrocarbon.

6. A sprayable hair lacquer composition comprising a solution of low viscosity polyvinyl butyral having 24% non-acetalized vinyl alcohol units and whose 5% solution in butanol has a viscosity of less than 70 cp. in isopropanol and dichloro-difluoro-methane, the said butyral being 0.5 to 5% by weight of the composition.

7. A process of holding human hair which comprises applying to the hair a solution of low viscosity polyvinyl acetal of an alkyl aldehyde having 2 to 8 carbon atoms and have 10 to 30% non-acetalized vinyl alcohol units and whose 5% solution in butanol has a viscosity of less than 70 cp. in a solvent selected from the group consisting of lower alkanols having 1 to 4 carbon atoms and mixtures of such alcohols with methylene chloride.

8. The process of claim 7 wherein the polyvinyl acetal contains a surface active compound to increase water dispersibility.

9. The process of claim 7 wherein the polyvinyl acetal is polyvinyl butyraldehyde.

10. A process for holding human hair which comprises applying to the hair a solution of polyvinyl butyral having about 24% unacetalized vinyl alcohol units and whose 5% solution in butanol has a viscosity of from 15 to 20 cp. in isopropanol.

(References on following page)

References Cited in the file of this patent

UNITED STATES PATENTS

| | | |
|---|---|---|
| 2,162,678 | Robertson | Jan. 13, 1939 |
| 2,186,598 | Bachman | Jan. 9, 1940 |
| 2,957,838 | Mills | Oct. 25, 1960 |

OTHER REFERENCES

Sagarin: Cosmetics, Science and Technology, Interscience Publishers, Inc., New York (1957), pages 565–567.

Sagarin: Cosmetics, Science and Technology, Interscience Publishers, Inc., New York (1957), pages 150–154 and 1004–1011.